US010788767B2

(12) United States Patent
Chiba et al.

(10) Patent No.: US 10,788,767 B2
(45) Date of Patent: Sep. 29, 2020

(54) TONER FOR DEVELOPING ELECTROSTATIC IMAGES

(71) Applicant: ZEON CORPORATION, Tokyo (JP)

(72) Inventors: Takeru Chiba, Tokyo (JP); Sakyo Yagyu, Tokyo (JP)

(73) Assignee: ZEON CORPORATION, Tokyo (JP)

(\*) Notice: Subject to any disclaimer, the term of this patent is extended or adjusted under 35 U.S.C. 154(b) by 0 days.

(21) Appl. No.: 16/311,787

(22) PCT Filed: Jun. 26, 2017

(86) PCT No.: PCT/JP2017/023426
§ 371 (c)(1),
(2) Date: Dec. 20, 2018

(87) PCT Pub. No.: WO2018/003749
PCT Pub. Date: Jan. 4, 2018

(65) Prior Publication Data
US 2019/0212667 A1    Jul. 11, 2019

(30) Foreign Application Priority Data

Jun. 30, 2016 (JP) .................................. 2016-130926

(51) Int. Cl.
G03G 9/097 (2006.01)
G03G 9/08 (2006.01)
C08G 77/04 (2006.01)

(52) U.S. Cl.
CPC ......... *G03G 9/09725* (2013.01); *C08G 77/04* (2013.01); *G03G 9/08* (2013.01); *G03G 9/0827* (2013.01); *G03G 9/097* (2013.01); *G03G 9/0975* (2013.01)

(58) Field of Classification Search
CPC ............. G03G 9/09725; G03G 9/0827; G03G 9/0975; G03G 9/08; G03G 9/097; C08G 77/04
See application file for complete search history.

(56) References Cited

U.S. PATENT DOCUMENTS

| 2009/0117477 A1 | 5/2009 | Magome et al. |
| 2010/0173240 A1 | 7/2010 | Sensui |
| 2016/0319077 A1 | 11/2016 | Ishizu et al. |

FOREIGN PATENT DOCUMENTS

| JP | H07-92722 A | 4/1995 |
| JP | 7-114213 A | 5/1995 |
| JP | 2013-140235 A | 7/2013 |
| JP | 2017-122873 A | 7/2017 |
| WO | 2015/107961 A1 | 7/2015 |

OTHER PUBLICATIONS

Notification of Transmittal of Translation of the International Preliminary Report on Patentability (Form PCT/IB/338) issued in counterpart International application No. PCT/JP2017/023426 dated Jan. 10, 2019 with Forms PCT/IB/373 and PCT/ISA/237. (8 pages).
Extended Search Report dated Jan. 3, 2020, issued in counterpart EP Application No. 17820104.2 (9 pages).

*Primary Examiner* — Thorl Chea
(74) *Attorney, Agent, or Firm* — Westerman, Hattori, Daniels & Adrian, LLP

(57) ABSTRACT

Provided is a toner for developing electrostatic images which is less likely to cause toner ejection and is excellent in printing durability. The toner comprises colored resin particles and external additives, wherein the external additives comprise an external additive A and an external additive B; wherein the external additive A is silica particles being surface-hydrophobized with a specific hydrophobizing agent and having a specific number average particle diameter; and wherein the external additive B is silicone resin particles having a ratio (BS/TS) of a BET specific surface area (BS) to a theoretical specific surface area (TS) in a range of from 3.0 to 30.0, and having a specific number average particle diameter.

3 Claims, No Drawings

TONER FOR DEVELOPING ELECTROSTATIC IMAGES

TECHNICAL FIELD

The present invention relates to a toner for developing electrostatic latent images formed by electrophotography, electrostatic recording, etc. More specifically, the present invention relates to a toner for developing electrostatic images which is less likely to cause toner ejection and is excellent in printing durability.

BACKGROUND ART

In image forming devices such as an electrophotographic device, an electrostatic recording device and an electrostatic printing device, a method for forming a desired image by forming an electrostatic latent image on a photoconductor and developing the image with a toner, is widely used. This method is applied to a copying machine, a printer, a facsimile machine, a multifunctional printer, etc.

For example, in an electrophotographic device using electrophotography, generally, the surface of its photoconductor comprising a photoconductive material is uniformly charged by various kinds of methods; an electrostatic latent image is formed on the photoconductor; the electrostatic latent image is developed using toner; a toner image thus obtained is transferred to a recording material such as a paper sheet; and then the toner image is fixed by heating, etc., thereby obtaining a copy.

As the toner used in image forming devices, a toner comprising colored resin particles (toner base particles) is generally used, in which an external additive such as inorganic or organic fine particles having a smaller particle diameter than the toner base particles, is add on the surface of the toner base particles in order to enhance toner functions such as charge stability and flowability, and obtain a desired printing performance.

Patent Document 1 discloses hydrophobized spherical polyalkylsilsesquioxane fine particles having a mass-based median diameter in a centrifugal sedimentation method within the range of from 0.05 μm to 0.3 μm. Patent Document 1 describes that the hydrophobized spherical polyalkylsilsesquioxane fine particles can be used alone as an additive for toner, and the hydrophobized spherical polyalkylsilsesquioxane fine particles can be used in combination with, for example, other surface-treated dry silica fine particles.

Patent Document 2 describes that a positively chargeable toner for electrostatic charge image development, which contains colored resin particles and an external additive and exhibits excellent printing durability and no occurrence of vertical streak, can be provided by incorporating silicone resin particles having a specific number average particle diameter and a specific particle size distribution and inorganic fine particles A having a specific particle diameter in specific amounts respectively based on the coloring resin particles.

CITATION LIST

Patent Document 1: International Publication No. WO2015/107961

Patent Document 2: Japanese Patent Application Laid-Open No. 2013-140235

SUMMARY OF INVENTION

Technical Problem

However, the inventors of the present invention found that the toners containing, as the external additives, the silicone resin particles and the inorganic fine particles described in Patent Documents 1 and 2, may be deteriorated and ejected from a toner cartridge during continuous printing, and they may have poor printing durability.

The present invention was achieved in light of the above circumstance. An object of the present invention is to provide a toner for developing electrostatic images, which is less likely to cause toner ejection and is excellent in printing durability.

Solution to Problem

To achieve the above object, the inventors of the present invention made diligent research and found that the above object can be achieved by a toner comprising colored resin particles and external additives, in which a combination of surface-hydrophobized silica particles having a specific number average particle diameter and silicone resin particles having a specific number average particle diameter and a specific porosity, are contained as the external additives.

The present invention was achieved in light of this finding. The present invention provides a toner for developing electrostatic images, comprising colored resin particles that comprises a binder resin, a colorant and a charge control agent, and external additives, wherein the external additives contain at least an external additive A and an external additive B; wherein the external additive A is silica particles being surface-hydrophobized with at least one hydrophobizing agent selected from the group consisting of a hydrophobizing agent containing an amino group, a silane coupling agent and silicone oil, and having a number average particle diameter of from 5 nm to 30 nm; wherein the external additive B is silicone resin particles having a ratio (BS/TS) of a BET specific surface area (BS), which is measured by a gas adsorption method, to a theoretical specific surface area (TS), which is obtained by calculating from a number average particle diameter measured by scanning electron microscope (SEM) observation on a theoretical calculation formula, in a range of from 3.0 to 30.0, and having a number average particle diameter of from 0.05 μm to 1.00 μm; and wherein, with respect to 100 parts by mass of the colored resin particles, a content of the external additive A is from 0.1 part by mass to 2.0 parts by mass, and a content of the external additive B is from 0.1 part by mass to 1.0 part by mass.

For toner for developing electrostatic images according to the present invention, it is preferable that the external additives further contain an external additive C; the external additive C is silica particles being surface-hydrophobized with at least one hydrophobizing agent selected from the group consisting of a hydrophobizing agent containing an amino group, a silane coupling agent and silicone oil, and having a number average particle diameter of from 31 nm to 200 nm; and a content of the external additive C is from 0.1 part by mass to 3.0 parts by mass, with respect to 100 parts by mass of the colored resin particles.

For the toner for developing electrostatic images according to the present invention, it is preferable that a water adsorption amount of the external additive B is 1.0% by mass or less.

For the toner for developing electrostatic images according to the present invention, it is preferable that a form of the external additive B is a spherical form.

For the toner for developing electrostatic images according to the present invention, it is preferable that the colored resin particles, the external additive A and the external additive C are positively chargeable, and particles of the toner are positively chargeable.

Advantageous Effects of Invention

According to the present invention, the toner for developing electrostatic images, which is less likely to cause toner ejection and is excellent in printing durability, is provided.

DESCRIPTION OF EMBODIMENTS

The toner for developing electrostatic images according to the present invention, is a toner for developing electrostatic images, comprising colored resin particles that comprises a binder resin, a colorant and a charge control agent, and external additives, wherein the external additives contain at least an external additive A and an external additive B; wherein the external additive A is silica particles being surface-hydrophobized with at least one hydrophobizing agent selected from the group consisting of a hydrophobizing agent containing an amino group, a silane coupling agent and silicone oil, and having a number average particle diameter of from 5 nm to 30 nm; wherein the external additive B is silicone resin particles having a ratio (BS/TS) of a BET specific surface area (BS), which is measured by a gas adsorption method, to a theoretical specific surface area (TS), which is obtained by calculating from a number average particle diameter measured by scanning electron microscope (SEM) observation on a theoretical calculation formula, in a range of from 3.0 to 30.0, and having a number average particle diameter of from 0.05 μm to 1.00 μm; and wherein, with respect to 100 parts by mass of the colored resin particles, a content of the external additive A is from 0.1 part by mass to 2.0 parts by mass, and a content of the external additive B is from 0.1 part by mass to 1.0 part by mass.

As described above, the toner of the present invention comprises the colored resin particles and the external additives. In the present invention, generally, the external additives are adhered to or partly embedded in the colored resin particles. Part of the external additives may be detached from the colored resin particles.

The external additives constituting the toner of the present invention contains at least the external additive A and the external additive B. Hereinafter, the external additives will be described in detail.

The external additive A is silica particles having a number average particle diameter of from 5 nm to 30 nm, and preferably from 6 to 15 nm. A toner with excellent flowability and transferability can be obtained by using the silica particles having a number average particle diameter in this range.

The number average particle diameters of the external additives A and B that are used in the present invention, and the number average particle diameter of the external additive C that is preferably used in the present invention, can be measured by a conventionally known method. For example, they can be measured as follows.

First, the particle diameters of the individual particles of each external additive are measured by means of a transmission electron Microscope (TEM), a scanning electron microscope (SEM) or the like. For each external additive, the particle diameters of at least 30 particles are measured in this manner, and the average is determined as the number average particle diameter of the particles. When it is found by TEM or SEM observation, that the form of the particles is a non-spherical form and the particles have long and short diameters, first, the long and short diameters are measured for each external additive. As just described, for each external additive, the long and short diameters of at least 30 particles are measured, and the averages are determined as the average long and short diameters of the external additive. The total value of the calculated average long and short diameters is divided by 2, and the value thus obtained is determined as the number average particle diameter of the external additive.

The silica particles used as the external additive A are silica particles being surface-hydrophobized with at least one hydrophobizing agent selected from the group consisting of a hydrophobizing agent containing an amino group, a silane coupling agent and a silicone oil. In the present invention, a phrase such as being surface-hydrophobized with hydrophobizing agent, is used to show the state of the surface and to specify such a property that the surface of the silica particles is hydrophobic.

As the hydrophobizing agent containing the amino group, examples include a silicon compound containing an amino group.

The silicon compound containing the amino group is not limited to a particular compound, and various kinds of compounds can be used. Examples include an amino group-containing silane coupling agent, an amino-modified silicone oil, a quaternary ammonium salt type silane, and a cyclic silazane represented by the following formula (1). Of them, the amino group-containing silane coupling agent and the cyclic silazane represented by the following formula (1) are particularly preferred from the viewpoint of positively charging ability and flowability. As the amino group-containing silane coupling agent, specific examples include N-2(aminoethyl)3-aminopropylmethyldimethoxysilane, N-2(aminoethyl)3-aminopropyltrimethoxysilane, 3-aminopropyltrimethoxysilane, 3-aminopropyltriethoxysilane, and N-phenyl-3-aminopropyltriethoxysilane. Of such coupling agents, the coupling agent containing the aminoalkyl group is preferred from the viewpoint of an excellent effect to enhance a stability of a charging performance to an environmental influence.

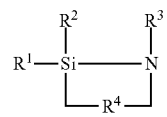

(1)

In the formula (1), $R^1$ and $R^2$ are independently selected from the group consisting of hydrogen, halogen, alkyl, alkoxy and aryloxy; $R^3$ is selected from the group consisting of hydrogen, $-(CH_2)\,CH_3$, $-C(O)\,(CH_2)\,CH_3$, $-C(O)NH_2$, $-C(O)NH(CH_2)_n CH_3$ and $-C(O)N[(CH_2)_n CH_3](CH_2)_m CH_3$ (where n and m are each an integer of 0 to 3); and $R^4$ is represented by $[(CH_2)_a(CHX)_b(CHY)_c]$ (where X and Y are independently selected from the group consisting of hydrogen, halogen, alkyl, alkoxy and aryloxy, and a, b and c are each an integer of from 0 to 6 which satisfies such a condition that the sum of a, b and c (a+b+c) is equal to an integer of from 2 to 6).

As the silane coupling agent (except one containing an amino group), examples include disilazanes such as hexamethyldisilazane, and alkylsilane compounds such as trimethylsilane, trimethylchlorosilane, dimethyldichlorosilane, methyltrichlorosilane, allyldimethylchlorosilane, benzyldimethylchlorosilane, methyltrimethoxysilane, methyltriethoxysilane, isobutyltrimethoxysilane, dimethyldimethoxysilane, dimethyldiethoxysilane, trimethylmethoxysilane, hydroxypropyltrimethoxysilane, phenyltrimethoxysilane, n-butyltrimethoxysilane, n-hexadecyltrimethoxysilane, n-octadecyltrimethoxysilane, vinyltrimethoxysilane, vinyltriethoxysilane, γ-methacryloxypropyltrimethoxysilane, and vinyltriacetoxysilane. These silane coupling agents may be used alone or in combination of two or more kinds. Of the silane coupling agents, hexamethyldisilazane (HMDS) is preferred.

As the silicone oil (except one containing an amino group), examples include dimethylpolysiloxane, methylhydrogenpolysiloxane, methylphenylpolysiloxane, and modified silicone oil.

As described above, for the hydrophobized silica particles being surface-hydrophobized with the hydrophobizing agent, the hydrophobicity measured by a methanol method is generally from 30% to 98%, preferably from 50% to 95%, and more preferably from 60% to 90%. When the hydrophobicity is smaller than 30%, there is a large influence by the environment. Especially, a decrease in charge occurs at high temperature and high humidity, and may easily cause fogging. On the other hand, when the hydrophobicity is larger than 98%, an increase in charge occurs at low temperature and low humidity and may cause a decrease in image density.

The content of the silica particles used as the external additive A, is from 0.1 part by mass to 2.0 parts by mass, and preferably from 0.3 part by mass to 1.2 parts by mass, with respect to 100 parts by mass of the colored resin particles.

When the content of the external additive A is below the range, a decrease in flowability occurs and causes fogging or transfer failure. On the other hand, when the content of the external additive A is above the range, an increase in charge amount occurs at low temperature and low humidity and causes print soiling or fixing failure.

The external additive B is silicone resin particles having a number average particle diameter of from 0.05 μm to 1 μm, and the number average particle diameter is preferably from 0.1 μm to 0.5 μm. When the number average particle diameter is in the range, the toner can have appropriate charge properties under a wide range of temperature environments and humidity environments.

For the silicone resin particles used as the external additive B, the ratio (hereinafter it may be simply referred to as BS/TS ratio) of a BET specific surface area (BS) per unit mass, which is measured by a gas adsorption method, to a theoretical specific surface area (TS) per unit mass, which is obtained by calculating from a number average particle diameter measured by scanning electron microscope (SEM) observation on a theoretical calculation formula, is in a range of from 3.0 to 30.0, preferably in a range of from 3.5 to 25.0, and more preferably in a range of from 4.0 to 20.0.

In the present invention, the BS/TS ratio is used as the indicator of the porosity of the silicone resin particles used as the external additive B. By the theoretical specific surface area (TS), the surface roughness of the particles cannot be evaluated; however, the surface roughness can be evaluated by the BET specific surface area (BS). Therefore, when the BS/TS ratio is high, the particles can be evaluated as particles having a high porosity. On the other hand, when the BS/TS ratio gets closer to 1, the particles can be evaluated as particles having a small porosity.

When the BS/TS ratio is below the range, toner ejection is likely to occur. On the other hand, when the BS/TS ratio is above the range, silicone resin particles production is difficult.

In the present invention, for the silicone resin particles used as the external additive B, the theoretical specific surface area (TS) per unit mass is calculated by the theoretical calculation formula and from the number average particle diameter measured by, among the above-mentioned number average particle diameter measuring methods, scanning electron microscope (SEM) observation.

That is, in the present invention, the silicone resin particles are assumed that they are in a spherical form (irrespective of the actual form), and the theoretical specific surface area (TS) per unit mass is obtained by the following theoretical calculation formula (1) that is to obtain the specific surface area per unit mass of a sphere.

$$\text{Theoretical specific surface area } TS \text{ (m}^2\text{/g)}=6/(\text{average density (g/cm}^3\text{)}\times\text{number average particle diameter (nm)}\times 10^3) \quad \text{Calculation formula (1)}$$

The method for obtaining the average density is not particularly limited, and a conventionally known method can be used.

The BET specific surface area (BS) per unit mass measured by the gas adsorption method, can be obtained by a method for measuring the amount of a monolayer of nitrogen gas adsorbed on the silicone resin particle surface with the use of the formula of BET.

To measure the BET specific surface area (BS) of the silicone resin particles used as the external additive B, a conventionally known method can be used. As the method for measuring the BET specific surface area (BS) of the silicone resin particles, examples include a method for measuring in accordance with a nitrogen adsorption method (a BET method) using a BET specific surface area measuring device (product name: MACSORB HM MODEL-1208, manufactured by: Mountech Co., Ltd.), etc.

In the present invention, the content of the external additive B is from 0.1 part by mass to 1.0 part by mass, and preferably from 0.2 part by mass to 0.7 part by mass, with respect to 100 parts by mass of the colored resin particles. When the content of the external additive B is below the range, post-endurance ejection is likely to occur, and printing durability decreases. On the other hand, when the content of the external additive B is above the range, filming is likely to occur.

In the present invention, the water adsorption amount of the external additive B is preferably 1.0% by mass or less, and more preferably 0.35% by mass or less. When the water adsorption amount of the external additive B is more than 1.0% by mass, fogging may be caused by a decrease in charge amount at high temperature and high humidity.

The silicone resin particles used as the external additive B are preferably surface-hydrophobized with a hydrophobizing agent such as a silane coupling agent. The type of the hydrophobizing agent is not particularly limited. For example, the hydrophobizing agent described in relation to the external additive A, can be used.

The form of the silicone resin particles used as the external additive B, is not particularly limited and may be an irregular form. The form is preferably a spherical form.

For the silicone resin particles used as the external additive B, the sphericity (Sc/Sr) is preferably from 0.970 to 1.000, and more preferably from 0.985 to 1.000.

When the sphericity (Sc/Sr) of the external additive B is above the range, the toner thus obtained is poor in thin line reproducibility.

In the present invention, the sphericity is defined as a value obtained by dividing the area (Sc) of a circle having the absolute maximum length of the particle as its diameter, by the substantial projected area (Sr) of the particle.

The sphericity (Sc/Sr) of the silicone resin particles used as the external additive B, is a value obtained as follows: a photograph of the silicone resin particles taken by an electron microscope, is analyzed for Sc and Sr by an image analyzer; the sphericity (Sc/Sr) of each particle is calculated; and the thus-obtained sphericities of the particles are averaged, thereby obtaining the sphericity (Sc/Sr) of the silicone resin particles.

To measure the sphericity of the external additive B, a conventionally known method can be used. As the method for measuring the sphericity of the external additive B, examples include the following method: an electron micrograph of the external additive B is taken, and the electron micrograph is measured by an image analyzer (product name: LUZEX IID, manufactured by: Nireco Corporation), thereby measuring the sphericity of the external additive B.

In the present invention, the external additives may be only the external additives A and B. It is preferable that the external additives further contain the external additive C.

The external additive C is silica particles having a number average particle diameter of from 31 nm to 200 nm, and preferably from 40 nm to 120 nm. When the external additive C is not used, a decrease in toner flowability occurs and may result in an increase in fogging or print soiling or a decrease in cleaning properties.

The silica particles used as the external additive C, are silica particles surface-hydrophobized with the same hydrophobizing agent as the above-mentioned external additive A. The hydrophobizing agent used for surface hydrophobization of the external additive A may be the same type as or a different type from the hydrophobizing agent used for surface hydrophobization of the external additive C. The hydrophobizing agent that is preferably used for surface treatment of the external additive C, is the same as the case of the external additive A.

The hydrophobicity of the hydrophobized silica particles being surface-hydrophobized with the hydrophobizing agent and used as the external additive C, is generally from 10% to 95%, preferably from 20% to 90%, and more preferably from 30% to 85%. When the hydrophobicity is smaller than 10%, the toner is susceptible to the environment. Especially, a decrease in charge occurs at high temperature and high humidity, and may easily cause fogging. On the other hand, when the hydrophobicity is larger than 95%, an increase in charge occurs at low temperature and low humidity and may cause a decrease in image density.

The content of the external additive C is generally from 0.1 part by mass to 3.0 parts by mass, and preferably from 0.3 part by mass to 2.0 parts by mass, with respect to 100 parts by mass of the colored resin particles. When the content of the external additive C is below the range, a decrease in cleaning properties tends to occur. On the other hand, when the content of the external additive C is above the range, print soiling or fixing failure tends to occur at low temperature and low humidity.

In the present invention, in addition to the external additives A, B and C, an external additive that has been conventionally used in toners may be further contained. As such an external additive, examples include inorganic fine particles and organic fine particles. As the inorganic fine particles, examples include aluminum oxide, titanium oxide, zinc oxide, tin oxide, cerium oxide, silicon nitride, calcium carbonate, calcium phosphate, barium titanate, and strontium titanate. As the organic fine particles, examples include methacrylic acid ester polymer particles, acrylic acid ester polymer particles, styrene-methacrylic acid ester copolymer particles, styrene-acrylic acid ester copolymer particles, core-shell type particles in which the core is formed with a styrene polymer and the shell is formed with a methacrylic acid ester polymer, and melamine resin particles.

The colored resin particles constituting the toner of the present invention are particles that contain at least the binder resin, the colorant and the charge control agent. Preferably, the colored resin particles further contain a release agent. As needed, the colored resin particles may further contain a magnetic material, etc.

As the binder resin, examples include resins that have been widely used in toners, such as polystyrene, styrene-butyl acrylate copolymer, polyester resin and epoxy resin.

As the colorant, examples include carbon black, titanium black, magnetic powder, oil black, titanium white, and all kinds of colorants and dyes. As the carbon black, one having a primary particle diameter of from 20 nm to 40 nm is preferably used. This is because, since the particle diameter is in this range, the carbon black can be uniformly dispersed in the toner, and fogging is less likely to occur.

To obtain a full color toner, a yellow colorant, a magenta colorant and a cyan colorant are generally used.

As the yellow colorant, examples include compounds such as an azo-based colorant and a condensed polycyclic colorant. As the compounds, examples include C.I. Pigment Yellow 3, 12, 13, 14, 15, 17, 62, 65, 73, 83, 90, 93, 97, 120, 138, 155, 180, 181, 185 and 186.

As the magenta colorant, examples include compounds such as an azo-based colorant and a condensed polycyclic colorant. As the compounds, examples include C.I. Pigment Red 31, 48, 57, 58, 60, 63, 64, 68, 81, 83, 87, 88, 89, 90, 112, 114, 122, 123, 144, 146, 149, 150, 163, 170, 184, 185, 187, 202, 206, 207, 209 and 251, and C.I. Pigment Violet 19.

As the cyan colorant, examples include a copper phthalocyanine compound and derivatives thereof, and an anthraquinone compound. As the compounds and derivatives, examples include C.I. Pigment Blue 2, 3, 6, 15, 15:1, 15:2, 15:3, 15:4, 16, 17 and 60.

The amount of the colorant is preferably from 1 part by mass to 10 parts by mass, with respect to 100 parts by mass of the binder resin.

The colored resin particles constituting the toner of the present invention contain a charge control agent. As the charge control agent, charge control agents that have been used in toners can be used without any particular limitation. Of the charge control agents, a charge control resin is preferably used due to the following reasons: the charge control resin has high compatibility with binder resin; the charge control resin is colorless; and a toner that the charge properties are stable during high-speed color continuous printing, is obtained. As the charge control resin, the following charge control resins can be used: positively-chargeable charge control resins such as quaternary ammonium (salt) group-containing copolymers produced in accordance with the descriptions in Japanese Patent Application Laid-Open (JP-A) Nos. S63-60458, H03-175456, H03-243954 and H11-15192, and negatively-chargeable charge control resins such as sulfonic acid (salt) group-containing copolymers produced in accordance with the descriptions in JP-A Nos. H01-217464 and H03-15858. In the present invention, a positively-chargeable charge control resin is preferably used.

The amount of a monomer unit having a quaternary ammonium (salt) group or sulfonic acid (salt) group contained in the copolymers, is preferably from 0.5% by mass to 15% by mass, and more preferably from 1% by mass to 10% by mass. When the content is in the range, it is easy to control the charge amount of the toner, and fogging is less likely to occur.

The weight average molecular weight of the charge control resin is preferably from 2,000 to 50,000, more preferably from 4,000 to 40,000, and most preferably from 6,000 to 35,000. When the weight average molecular weight of the charge control resin is less than 2,000, toner offset may occurs. On the other hand, when the weight average molecular weight is more than 50,000, the toner may deteriorate fixability.

The glass transition temperature of the charge control resin is preferably from 40° C. to 80° C., more preferably from 45° C. to 75° C., and most preferably from 45° C. to 70° C. When the glass transition temperature is less than 40° C., the toner deteriorate storage stability. When the glass transition temperature is more than 80° C., the toner may deteriorate fixability.

The amount of the charge control agent is generally from 0.01 part by mass to 30 parts by mass, and preferably from 0.3 part by mass to 25 parts by mass, with respect to 100 parts by mass of the binder resin.

As the release agent preferably contained in the colored resin particles constituting the toner of the present invention, examples include polyolefin waxes such as low-molecular-weight polyethylene, low-molecular-weight polypropylene and low-molecular-weight polybutylene; natural plant waxes such as candelilla wax, carnauba wax, rice wax, Japan wax and jojoba wax; petroleum waxes and modified waxes thereof, such as paraffin wax, microcrystalline wax, and petrolatum; synthetic waxes such as Fischer-Tropsch wax; and ester compounds such as pentaerythritol tetramyristate, pentaerythritol tetrapalmitate, behenyl behenate, and dipentaerythritol hexamyristate.

These release agents may be used alone or in combination of two or more kinds.

Of these release agents, the synthetic waxes and the ester compounds are preferred. Of them, preferred is such an ester compound that in a DSC curve measured by a differential scanning calorimeter, the endothermic peak temperature in temperature rising is in a range of preferably from 30° C. to 150° C., more preferably from 40° C. to 100° C., and most preferably from 50° C. to 80° C. This is because a toner with an excellent balance between fixability and releasability can be obtained.

More preferred is an ester compound which has a molecular weight of 1000 or more, which is dissolved in an amount of 5 parts by mass or more at 25° C. with respect to 100 parts by mass of styrene, and which has an acid value of 10 mgKOH/g or less. This is because such an ester compound is remarkably effective in decreasing toner fixing temperature. As such an ester compound, behenyl behenate is particularly preferred. The "endothermic peak temperature" means a value measured in accordance with ASTM D 3418-82.

The amount of the release agent is generally from 3 part by mass to 20 parts by mass, and preferably from 5 part by mass to 15 parts by mass, with respect to 100 parts by mass of the binder resin.

The colored resin particles may be so-called core-shell type (or "capsule type") particles obtained by combining two different polymers as the inside (core layer) and outside (shell layer) of the particles. The core-shell type particles are preferred since they can achieve a balance between lowering of fixing temperature and prevention of aggregation during storage by covering the inside (core layer) composed of a substance having a low softening point with a substance having a higher softening point.

In general, the core layer of the core-shell type particles is composed of the binder resin, the colorant, the charge control agent and the release agent, and the shell layer thereof is composed of only the binder resin.

The mass ratio of the core layer to the shell layer of the core-shell type particles is not particularly limited. It is generally from 80/20 to 99.9/0.1 (the core layer/the shell layer).

By controlling the shell layer ratio to the above ratio, the toner can obtain both storage stability and low-temperature fixability.

The average thickness of the shell layers of the core-shell type particles is considered to be generally from 0.001 μm to 0.1 μm, preferably from 0.003 μm to 0.08 μm, and more preferably from 0.005 μm to 0.05 μm. As the thickness increases, the fixability of the toner may decrease. As the thickness decreases, the storage stability of the toner may decrease.

When the colored resin particles are core-shell type particles, the surface of the core particles constituting the core-shell colored resin particles, is not needed to be wholly covered with the shell layer. The surface of the core particles may be partly covered with the shell layer.

For the core-shell type particles, when the core particle diameter and the shell layer thickness can be observed with an electron microscope, they can be determined by randomly selecting a particle from particles shown in a photograph taken by the electron microscope and directly measuring the size of a particle and the thickness of the shell layer of the same particle. When it is difficult to observe the core and shell with the electron microscope, the core particle diameter and the shell layer thickness can be calculated from the particle diameter of the core particle and the amount of a monomer used to form the shell in toner production.

For the colored resin particles constituting the toner of the present invention, the volume average particle diameter (Dv) is preferably from 3 μm to 10 μm, and more preferably from 4 μm to 8 μm. When the Dv is less than 3 μm, toner flowability decreases and may decrease transferability, cause blur, or decrease image density. When the Dv is more than 10 μm, image resolution may decrease.

For the colored resin particles constituting the toner of the present invention, the ratio (Dv/Dn) between the volume average particle diameter (Dv) and the number average particle diameter (Dn) is preferably from 1.0 to 1.3, and more preferably from 1.0 to 1.2. When the ratio Dv/Dn is more than 1.3, blur or a decrease in transferability, image density and resolution may occur.

The volume average particle diameter and number average particle diameter of the toner can be measured by means of particle size analyzer MULTISIZER (product name, manufactured by Beckman Coulter, Inc.), for example.

For the colored resin particles constituting the toner of the present invention, the average circularity is from 0.94 to 0.995, and preferably from 0.95 to 0.99. When the average circularity is less than 0.94, a decrease in transferability occurs.

The average circularity can be relatively easily controlled in the above described range, by applying a producing method such as a phase inversion emulsion method, a solution suspension method, a polymerization method or the like.

In the present invention, "circularity" is defined as a value obtained by dividing the perimeter of a circle having the same area as the projected area of a particle image by the perimeter of the projected image of the particle. Also in the present invention, "average circularity" is used as a simple method for quantitatively representing the shape of the particles and is the indicator of the degree of the surface roughness of the toner. The average circularity is 1 when the toner is perfectly spherical, and it gets smaller as the surface shape of the colored resin particles becomes more complex.

The average circularity (Ca) is a value obtained by the following calculation formula (2):

$$\text{Average Circularity } (Ca) = \left(\sum_{i=1}^{n}(Ci \times f\ i)\right) / \sum_{i=1}^{n}(f\ i) \quad \text{Calculation Formula (2)}$$

In the above formula, n is the number of particles for each of which the circularity Ci was obtained.

In the above formula, Ci is the circularity of each of particles having an equivalent circle diameter of from 0.6 μm to 400 μm and is calculated by the following calculation formula (3) based on the perimeter measured for each particle:

Circularity (Ci) = (The perimeter of a circle having the same area as the projected area of a particle image)/(The perimeter of the projected particle image)　　　Calculation Formula (3)

In the above formula, fi is the frequency of the particles having the circularity Ci.

The circularity and the average circularity can be measured by means of flow particle image analyzer "FPIA-3000" (product name, manufactured by: Sysmex Corporation).

The method for producing the colored resin particles is not particularly limited. The polymerization method is preferred since the above-described circularity can be easily obtained.

Next, the method for producing the colored resin particles by the polymerization method will be described in detail. The colored resin particles constituting the toner of the present invention can be obtained as follows: the colorant, the charge control agent and other additives are dissolved or dispersed in a polymerizable monomer, which is a raw material for the binder resin; in an aqueous dispersion medium containing a dispersion stabilizer, the thus-obtained mixture or dispersion is polymerized by adding a polymerization initiator thereto and, as needed, particles thus produced are associated with each other; then, the particles are recovered from the mixture by filtration, and then washed, dehydrated and dried, thereby producing the colored resin particles.

As the polymerizable monomer, examples include a monovinyl monomer, a crosslinkable monomer and a macromonomer. The polymerizable monomer is polymerized into a binder resin component.

As the monovinyl monomer, examples include aromatic vinyl monomers such as styrene, vinyltoluene and α-methylstyrene; (meth)acrylic acid; (meth)acrylic copolymers such as methyl (meth)acrylate, ethyl (meth)acrylate, propyl (meth)acrylate, butyl (meth)acrylate, 2-ethylhexyl (meth)acrylate, cyclohexyl (meth)acrylate, and isobornyl (meth)acrylate; and monoolefin monomers such as ethylene, propylene and butylene.

These monovinyl monomers may be used alone or in combination of two or more kinds. Of them, it is preferable to use the aromatic vinyl monomer alone or to use a combination of the aromatic vinyl monomer and the (meth)acrylic monomer.

Hot offset is effectively reduced by using a crosslinkable monomer in combination with the monovinyl monomer. The crosslinkable monomer is a monomer containing two or more vinyl groups. As the crosslinkable monomer, examples include divinylbenzene, divinylnaphthalene, ethylene glycol dimethacrylate, pentaerythritol triallyl ether, and trimethylolpropane triacrylate. These crosslinkable monomers may be used alone or in combination of two or more kinds. The amount of the crosslinkable monomer is generally 10 parts by mass or less, and preferably from 0.1 part by mass to 2 parts by mass, with respect to 100 parts by mass of the monovinyl monomer.

Also, it is preferable to use a macromonomer in combination with the monovinyl monomer, since the balance between the storage stability and low-temperature fixability can be excellent. The macromonomer is an oligomer or polymer having a polymerizable carbon-carbon unsaturated double bond at the end of a polymer chain and generally having a number average molecular weight of from 1,000 to 30,000.

The macromonomer is preferably if the macromonomer can provide a polymer having a higher glass transition temperature than a polymer obtained by polymerizing the monovinyl monomer.

The amount of the macromonomer is generally from 0.01 part by mass to 10 parts by mass, preferably from 0.03 part by mass to 5 parts by mass, and more preferably from 0.05 part by mass to 1 part by mass, with respect to 100 parts by mass of the monovinyl monomer.

As the polymerization initiator, examples include persulfates such as potassium persulfate and ammonium persulfate; azo compounds such as 4,4'-azobis(4-cyanovaleric acid), 2,2'-azobis(2-methyl-N-(2-hydroxyethyl)propionamide, 2,2'-azobis(2-amidinopropane)dihydrochloride, 2,2'-azobis(2,4-dimethylvaleronitrile) and 2,2'-azobisisobutyronitrile; and peroxides such as di-t-butyl peroxide, benzoyl peroxide, t-butylperoxy-2-ethylhexanoate, t-hexylperoxy-2-ethylhexanoate, t-butyl peroxypivalate, di-isopropyl peroxydicarbonate, di-t-butylperoxy isophthalate, and t-butylperoxy isobutyrate. Also, a redox initiator (a combination of the polymerization initiator with a reducing agent) may be used.

The amount of the polymerization initiator used for the polymerization of the polymerizable monomer is preferably from 0.1 part by mass to 20 parts by mass, more preferably from 0.3 part by mass to 15 parts by mass, and most preferably from 0.5 part by mass to 10 parts by mass, with respect to 100 parts by mass of the polymerizable monomer. The polymerization initiator may be added to a polymerizable monomer composition in advance or, in some cases, the polymerization initiator may be added to the aqueous dispersion medium in a state after being subjected to droplets formation.

In the polymerization, a dispersion stabilizer is preferably added to the aqueous dispersion medium. As the dispersion stabilizer, examples include metal compounds including sulfates such as barium sulfate and calcium sulfate, carbonates such as barium carbonate, calcium carbonate and magnesium carbonate, phosphates such as calcium phosphate, metal oxides such as aluminum oxide and titanium oxide, and metal hydroxides such as aluminum hydroxide, magnesium hydroxide and iron(II)hydroxide; water-soluble polymers such as polyvinyl alcohol, methyl cellulose and gelatin; and surfactants such as an anionic surfactant, a nonionic surfactant and an ampholytic surfactant. These dispersion stabilizers may be used alone or in combination of two or more kinds.

The amount of the dispersion stabilizer is preferably from 0.1 part by mass to 20 parts by mass, with respect to 100 parts by mass of the polymerizable monomer. When the amount of the dispersion stabilizer is less than 0.1 part by mass, it is difficult to obtain sufficient polymerization stability, and a polymer aggregate may easily generate. On the other hand, when the amount of the dispersion stabilizer is more than 20 parts by mass, the particle diameter of the polymerized toner becomes too small and may be unsuitable for practical use.

It is preferable to use a molecular weight modifier in the polymerization. As the molecular weight modifier, examples include mercaptans such as t-dodecyl mercaptan, n-dodecyl mercaptan, n-octyl mercaptan and 2,2,4,6,6-pentamethyl-heptane-4-thiol. The molecular weight modifier may be added before or during the polymerization. The amount of the molecular weight modifier is preferably from 0.01 part by mass to 10 parts by mass, and more preferably from 0.1 part by mass to 5 parts by mass, with respect to 100 parts by mass of the polymerizable monomer.

The method for producing the above-mentioned, preferred core-shell type colored resin particles is not particularly limited. The core-shell type colored resin particles can be produced by a conventional method. As the method, examples include a spray dry method, an interface reaction method, an in situ polymerization method and a phase separation method. In particular, the core-shell type colored resin particles are obtained as follows: the colored resin particles obtained by a pulverization method, a polymerization method, an association method or a phase inversion emulsion method, are used as the core particles, and they are each covered with a shell layer, thereby obtaining the core-shell type colored resin particles. Of these production methods, the in situ polymerization method and the phase separation method are preferred from the viewpoint of production efficiency.

The in situ polymerization method for producing the capsule type colored resin particles with a core-shell structure will be described below.

The capsule type colored resin particles with a core-shell structure, can be obtained by adding a polymerizable monomer for forming a shell (a polymerizable monomer for shell) and a polymerization initiator to an aqueous dispersion medium in which core particles are dispersed, and then polymerizing the mixture.

As the method for forming the shell, examples include: a method in which the polymerizable monomer for shell is added to a reaction system of a polymerization reaction developed for obtaining the core particles, and a polymerization process is continued; and a method in which core particles obtained in a different reaction system is prepared, the polymerizable monomer for shell is added thereto and a polymerization process is carried out.

The polymerizable monomer for shell may be added to the reaction system at once or may be added continuously or intermittently to the reaction system by means of a pump such as a plunger pump.

As the polymerizable monomer for shell, monomers that can form a polymer having a glass transition temperature of more than 80° C., such as styrene, acrylonitrile and methyl methacrylate, can be used alone or in combination of two or more kinds.

A water-soluble polymerization initiator is preferably added at the time of adding the polymerizable monomer for shell, since the capsule type colored resin particles with a core-shell structure can be easily obtained. By adding the water-soluble polymerization initiator at the time of adding the polymerizable monomer for shell, it is considered that the water-soluble polymerization initiator has moves to the vicinity of the outer surface of the core particles, to which the polymerizable monomer for shell moved, and a polymer (shell) can be easily formed on the core particle surface.

As the water-soluble polymerization initiator, examples include persulfates such as potassium persulfate and ammonium persulfate, and azo-based initiators such as 2,2'-azobis(2-methyl-N-(2-hydroxyethyl)propionamide) and 2,2'-azobis-(2-methyl-N-(1,1-bis(hydroxymethyl)2-hydroxyethyl) propionamide). The amount of the water-soluble polymerization initiator is generally from 0.1 part by mass to 50 parts by mass, and preferably from 1 part by mass to 30 parts by mass, with respect to 100 parts by mass of the polymerizable monomer for shell.

The polymerization temperature is preferably 50° C. or more, and more preferably from 60° C. to 95° C. The reaction time is preferably from 1 hour to 20 hours, and more preferably from 2 hours to 10 hours. After the polymerization is completed, the colored resin particles obtained by the polymerization is preferably subjected to repeated operations of filtering, washing, dehydrating and drying several times as needed, according to a conventional method.

When an inorganic compound such as an inorganic hydroxide is used as the dispersion stabilizer, preferably, the dispersion stabilizer is dissolved in water by adding acid or alkali to the aqueous dispersion of the colored resin particles obtained by the polymerization, and then the dispersion stabilizer is removed. When a colloid of a hardly water-soluble inorganic hydroxide is used as the dispersion stabilizer, the pH of the aqueous dispersion is preferably controlled to 6.5 or less by adding acid. As the acid, examples include inorganic acids such as sulfuric acid, hydrochloric acid and nitric acid, and organic acids such as formic acid and acetic acid. Sulfuric acid is particularly preferred for its high removal efficiency and small influence on production facilities.

The method for filtering the colored resin particles from the aqueous dispersion medium and dehydrating them is not particularly limited. As the method, examples include a centrifugal filtration method, a vacuum filtration method and a pressure filtration method. Of them, the centrifugal filtration method is preferred.

The toner of the present invention is obtained by mixing the colored resin particles, the external additives and, as needed, other fine particles by means of a high-speed mixer such as Henschel Mixer.

In the present invention, it is preferable that all of the external additive A, the external additive C, and the colored resin particles are positively chargeable. As just described, since the colored resin particles and the two external additives are all positively chargeable, the toner particles thus obtained exhibit positively chargeable.

EXAMPLES

Hereinafter, the present invention will be described further in detail, with reference to examples and comparative examples. The scope of the present invention may not be limited to the following examples. Herein, "part(s)" and "%" are based on mass if not particularly mentioned.

In the following examples and comparative examples, methods for measuring and evaluating properties are as follows.

1. Toner Evaluation (1) Printing Durability

In a printing durability test, a commercially-available, non-magnetic one-component development printer was used. The toner was packed into the toner cartridge of the development device. Then, printing sheets were loaded in the device.

The printer was left for 24 hours under a normal-temperature and normal-humidity (N/N) environment (temperature: 23° C., humidity: 50%). Then, under the same environment, 20,000 sheets were continuously printed at an image density of 0%.

Solid pattern printing (image density 100%) was carried out at every 500th sheets, and the resulting black solid images were measured for image density by means of a reflection image densitometer (product name: RD918, manufactured by: Macbeth). Then, a white solid pattern printing (image density 0%) was carried out. When printing halfway, the printer was stopped. A piece of an adhesive tape (product name: SCOTCH MENDING TAPE 810-3-18, manufactured by: Sumitomo 3M Limited) was attached to a non-image area on the photoconductor of the printer after development to make the toner adhere in the area to the tape piece. Then, the tape piece was removed therefrom and attached to a printing sheet. Next, the whiteness degree (B) of the printing sheet on which the tape piece was attached, was measured with a whiteness colorimeter (product name: ND-1, manufactured by: Nippon Denshoku Industries Co., Ltd.). In the same manner, an unused piece of the adhesive tape was attached to the printing sheet, and the whiteness degree (A) was measured. The difference in whiteness degree (B−A) was determined as a fog value. As the fog value gets smaller, fog decreases and a better result is obtained.

The number of continuously printed sheets that could maintain such an image quality that the image density is 1.3 or more and the fog value is 5 or less, was determined.

(2) Filming Evaluation

In the same manner as above, 20,000 sheets were continuously printed. Every 500th sheets, the photoconductor was visually observed to check the presence of filming. The number of sheets on which filming was found, was determined as the number of sheets on which filming occurred.

(3) Solid Pattern Followability

In the same manner as above, the toner was packed into the toner cartridge of the printer, and the printer was left under a normal-temperature and normal-humidity (N/N) environment for one day. Then, solid black pattern printing (image density 100%) was carried out on 10 sheets. Using a reflection image densitometer (product name: RD918, manufactured by: Macbeth), the image density of a part of the solid pattern printed on the 10th sheet, which is a part downstream 50 mm from the front edge of the pattern, and the image density of another part of the solid pattern printed on the 10th sheet, which is a part upstream 50 mm from the rear edge of the pattern, were measured. The difference in image density between the front and the rear parts was determined as the indicator of solid pattern followability. As the difference between the image densities gets smaller, the solid pattern followability gets better.

(4) Evaluation of Ejection at Post-endurance Supply

After the above-mentioned printing durability test, the toner remaining in the toner cartridge was recovered and mixed with the same amount of unused toner as the remaining toner. The mixed toner was packed into the toner cartridge of the development device. The toner cartridge was left under a normal-temperature and normal-humidity (N/N) environment (temperature: 23° C., humidity: 50%) for one day. Then, continuous printing was carried out.

The continuous printing of 100 sheets was carried out in the condition at an image density of 5% under a normal-temperature and normal-humidity (N/N) environment (temperature: 23° C., humidity: 50%). Then, the toner ejected from the toner cartridge onto the printing paper sheets, was checked and evaluated in accordance with the following evaluation criteria. Of the following criteria, A to C are determined as satisfactory.

[Evaluation criterion]

A: No ejection occurred

B: Slight ejection that ended during printing of up to 3 sheets

C: Slight ejection that did not end during printing of up to 100 sheets

D: Severe ejection that did not end during printing of up to 100 sheets (5) Minimum Fixing Temperature A fixing test was carried out by using a commercially-available, non-magnetic one-component development printer modified so that the temperature of its fixing roll can be varied. The fixing test was carried out by printing a solid black pattern (image density: 100%) and varying the temperature of the fixing roll of the modified printer in steps of 5° C. to measure the fixing rate of the toner at each temperature, thereby finding a relationship between the temperature and the fixing rate. The fixing rate was calculated from the ratio of image densities before and after a peeling operation using a piece of tape, which was carried out on a solid black pattern-printed area (image density: 100%) on a test paper sheet. Specifically, assuming that the image density before the peeling of the tape piece is ID (before), and the image density after the peeling thereof is ID (after), the fixing rate can be calculated by the following Calculation Formula (4):

Fixing rate (%) =(ID (after)/ID (before))× 100    Calculation Formula (4)

The peeling operation using the tape is a series of the following operations: a piece of an adhesive tape (product name: SCOTCH MENDING TAPE 810-3-18, manufactured by: Sumitomo 3M Limited) is applied to a measuring area on a test paper sheet; the tape piece is attached to the sheet by pressing the tape piece at a certain pressure; and the attached tape piece is then peeled at a certain speed in a direction along the paper sheet. The image density was measured by means of a reflection image densitometer (product name: RD914, manufactured by: McBeth Co.) In this fixing test, the minimum temperature of the fixing roll at which the fixing rate of the toner was more than 80%, was defined as the minimum fixing temperature of the toner.

2. Properties of External Additive (1) Calculation of Number Average Particle Diameter and Theoretical Specific Surface Area (TS) of External Additive B For the particles used as the external additive B, an SEM image was taken by an ultra-high resolution field emission scanning electron microscope (product name: SU9000, manufactured by: Hitachi High-Technologies Corporation). Of the particles shown on the image, 30 particles were randomly selected. Each of the selected particles was measured for particle diameter, and the number average particle diameter of the 30 particles was calculated. From the thus-obtained number average particle diameter, a theoretical specific surface area (TS) was obtained by the aforementioned theoretical calculation formula (1) for obtaining the specific surface area per unit mass of a sphere.

(2) Measurement of BET Specific Surface Area (BS) of External Additive B

For the particles used as the external additive B, the BET specific surface area (BS) was measured by a nitrogen adsorption method (a BET method) using a fully automatic BET specific surface area measuring device (product name: MACSORB HM MODEL-1208, manufactured by: Mountech Co., Ltd.)

(3) Measurement of Particle Size Distribution of External Additive B

First, 0.5 g of the particles used as the external additive B were dispersed in 50 mL of water by an ultrasonic washing machine (product name: BRANSONIC 1510J, manufactured by: Branson Ultrasonics, 42 KHz, 90 W, 2 L) to prepare an aqueous dispersion of the particles. Using the aqueous dispersion, the particle size distribution was measured by a dynamic light scattering particle size distribution measuring device (product name: LB-550, manufactured by: HORIBA, Ltd.) Then, a particle size distribution Dv90/Dv50 was calculated from a particle diameter Dv50 (a volume cumulative 50% particle diameter) and a particle diameter Dv90 (a volume cumulative 90% particle diameter).

(4) Measurement of Sphericity of External Additive B

The particles used as the external additive B were measured as follows.

The sphericity (Sc/Sr) is a value obtained by dividing the area (Sc) of a circle having the maximum absolute length of the particle as its longer diameter by the substantial projected area (Sr) of the particle. Specifically, an electron micrograph of the particles is taken, and the micrograph was measured by an image analyzer (product name: LUZEX IID, manufactured by: Nireco Corporation) in the condition that the area ratio of the particles with respect to the frame area is up to 2%, and the total number of processed particles is 100. The average of the 100 processed particles was determined as the sphericity.

(5) Measurement of Number Average Particle Diameters of External Additives A and C First, 0.5 g of the particles used as the external additive A were dispersed in 50 mL of water by an ultrasonic washing machine (product name: BRANSONIC 1510J, manufactured by: Branson Ultrasonics, 42 KHz, 90 W, 2 L) to prepare an aqueous dispersion of the particles. The aqueous dispersion was measured by a dynamic light scattering particle size distribution measuring device (product name: LB-550, manufactured by: HORIBA, Ltd.), and the number average particle diameter of the external additive A was obtained. In the same manner, the number average particle diameter of the external additive C was obtained.

3. Production of Silicone Resin Particles

Production Example 1

First, 60.0 g of water and, as a catalyst, 0.01 g of acetic acid were put in a 200 mL recovery flask and stirred at 30° C. Then, 70.0 g of methyltrimethoxysilane was added thereto. The mixture was stirred for one hour, thereby obtaining a raw material solution.

Next, 3.0 g of 25% aqueous ammonia solution, 128.0 g of water, and 390.0 g of methanol were put in a 1000 mL recovery flask and stirred at 30° C. to prepare an alkaline aqueous medium. To the alkaline aqueous medium, the raw material solution was added in a dropwise manner for one minute. After the addition of the raw material solution, the mixed solution thus obtained was stirred for 25 minutes to develop a polycondensation reaction of a fine particle precursor, thereby obtaining a polycondensation reaction solution.

As an aqueous solution, 3,000 g of water was put in a 5000 mL recovery flask. With stirring the water at 25° C., the polycondensation reaction solution was added thereto in a dropwise manner for one minute. The water turned turbid white shortly after it was mixed with the polycondensation reaction solution. Therefore, a dispersion liquid containing silicone particles was obtained.

As a hydrophobizing agent, 30.5 g of hexamethyldisilazane was added to the silicone particle dispersion liquid. As a result of stirring the dispersion liquid at 25° C. for 48 hours, a powder of hydrophobized spherical polymethylsilsesquioxane fine particles floated in the upper part of the liquid, thereby obtaining a powder floating liquid. The liquid was left to stand for 5 minutes to allow the powder to float to the surface. Then, the floating powder was recovered by suction filtration and dried under reduced pressure at 100° C. for 24 hours, thereby obtaining 32 g of a dried powder of silicone resin particles A.

Production Example 2

First, 60.0 g of water and, as a catalyst, 0.01 g of acetic acid were put in a 200 mL recovery flask and stirred at 30° C. Then, 70.0 g of methyltrimethoxysilane was added thereto. The mixture was stirred for one hour, thereby obtaining a raw material solution.

Next, 3.0 g of 25% aqueous ammonia solution, 128.0 g of water, and 390.0 g of methanol were put in a 1000 mL recovery flask and stirred at 30° C. to prepare an alkaline aqueous medium. To the alkaline aqueous medium, the raw material solution was added in a dropwise manner for one minute. After the addition of the raw material solution, the mixed solution thus obtained was stirred for 25 minutes to develop a polycondensation reaction of a fine particle precursor, thereby obtaining a polycondensation reaction solution.

As an aqueous solution, 400 g of water was put in a 5000 mL recovery flask. With stirring the water at 25° C., half amount of the polycondensation reaction solution was added thereto in a dropwise manner for one minute. The water turned turbid white shortly after it was mixed with the polycondensation reaction solution. Therefore, a dispersion liquid containing silicone particles was obtained.

As a hydrophobizing agent, 10.2 g of hexamethyldisilazane was added to the silicone particle dispersion liquid. As a result of stirring the dispersion liquid at 25° C. for 48 hours, a powder of hydrophobized spherical polymethylsilsesquioxane fine particles floated in the upper part of the liquid, thereby obtaining a powder floating liquid. The liquid was left to stand for 5 minutes to allow the powder to float to the surface. Then, the floating powder was recovered by suction filtration and dried under reduced pressure at 100° C. for 36 hours, thereby obtaining 22 g of a dried powder of silicone resin particles B.

Production Example 3

First, 60.0 g of water and, as a catalyst, 0.01 g of acetic acid were put in a 200 mL recovery flask and stirred at 30°

C. Then, 130.0 g of methyltrimethoxysilane was added thereto. The mixture was stirred for one hour, thereby obtaining a raw material solution.

Next, 3.0 g of 25% aqueous ammonia solution, 128.0 g of water, and 390.0 g of methanol were put in a 1000 mL recovery flask and stirred at 30° C. to prepare an alkaline aqueous medium. To the alkaline aqueous medium, 122.0 g of the raw material solution was added in a dropwise manner for one minute. After the addition of the raw material solution, the mixed solution thus obtained was stirred for 25 minutes to develop a polycondensation reaction of a fine particle precursor, thereby obtaining a polycondensation reaction solution.

As an aqueous solution, 2,500 g of water was put in a 5000 mL recovery flask. With stirring the water at 25° C., the polycondensation reaction solution was added thereto in a dropwise manner for one minute. The water turned turbid white shortly after it was mixed with the polycondensation reaction solution. Therefore, a dispersion liquid containing silicone particles was obtained.

As a hydrophobizing agent, 20.4 g of hexamethyldisilazane was added to the silicone particle dispersion liquid. As a result of stirring the dispersion liquid at 25° C. for 48 hours, a powder of hydrophobized spherical polymethylsilsesquioxane fine particles floated in the upper part of the liquid, thereby obtaining a powder floating liquid. The liquid was left to stand for 5 minutes to allow the powder to float to the surface. Then, the floating powder was recovered by suction filtration and dried under reduced pressure at 100° C. for 24 hours, thereby obtaining 68 g of a dried powder of silicone resin particles C.

4. Toner Production

Example 1

First, 78 parts of styrene and 22 parts of n-butyl acrylate as polymerizable monomers, and 5 parts of carbon black (product name: #25B, manufactured by: Mitsubishi Chemical Corporation) as a black colorant, were dispersed by means of an in-line type emulsifying and dispersing machine (product name: MILDER, manufactured by: Pacific Machinery & Engineering Co., Ltd.), thereby obtaining a polymerizable monomer mixture.

To the polymerizable monomer mixture, 1.0 part of a charge control resin (a quaternary ammonium group-containing styrene acrylic resin) as a charge control agent, 5.0 parts of a fatty acid ester wax (behenyl behenate) as a release agent, 0.3 part of a polymethacrylic acid ester macromonomer (product name: AA6, manufactured by: Toagosei Co., Ltd.) as a macromonomer, 0.6 part of divinylbenzene as a crosslinkable polymerizable monomer, and 1.6 parts of t-dodecyl mercaptan as a molecular weight modifier, were added. They were mixed and dissolved to prepare a polymerizable monomer composition.

Separately, an aqueous solution of 7.2 parts of sodium hydroxide (alkali metal hydroxide) dissolved in 50 parts of ion-exchanged water, was gradually added to an aqueous solution of 12.2 parts of magnesium chloride (water-soluble polyvalent metal salt) dissolved in 250 parts of ion-exchanged water, while stirring at room temperature, thereby preparing a magnesium hydroxide colloid (hardly water-soluble metal hydroxide colloid) dispersion.

A suspension thus obtained in which the droplets of the polymerizable monomer composition were dispersed (a polymerizable monomer composition dispersion) was put in a reactor furnished with stirring blades, and the temperature thereof was increased to 90° C. to initiate a polymerization reaction. When a polymerization conversion rate reached almost 100%, 1 part of methyl methacrylate as a polymerizable monomer for shell, and 0.3 part of 2,2'-azobis(2-methyl-N-(2-hydroxyethyl)-propionamide) (product name: VA-086, manufactured by: Wako Pure Chemical Industries, Ltd., water-soluble) as a polymerization initiator for shell, which was dissolved in 10 parts of ion-exchanged water, were added to the reactor. The reaction was continued for 4 hours at 90° C. Then, the reaction was stopped by water-cooling the reactor, thereby obtaining an aqueous dispersion of colored resin particles having a core-shell type structure.

The aqueous dispersion of the colored resin particles was subjected to acid washing by, while agitating the aqueous dispersion at room temperature, adding sulfuric acid in a dropwise manner until the pH of the aqueous dispersion reached 6.5 or less. Next, the aqueous dispersion was subjected to filtration separation. Then, a solid matter thus obtained was mixed with 500 parts of ion-exchanged water, re-slurried, repeatedly subjected to a water washing treatment (washing, filtering and dehydrating) several times, and then subjected to filtration separation. A solid matter thus obtained was put in the container of a dryer and dried at 45° C. for 48 hours, thereby obtaining dried colored resin particles. For the obtained colored resin particles, the volume average particle diameter (Dv) was 9.7 μm; the number average particle diameter (Dn) was 7.5 μm; the particle size distribution (Dv/Dn) was 1.13; and the average circularity was 0.987.

To 100 parts of the colored resin particles obtained above, 0.8 part of positively-chargeable silica particles being surface-hydrophobized with the hydrophobizing agents (hexamethylsilazane and cyclic silazane) and having a number average particle diameter of 20 nm (product name: TG7120, manufactured by: Cabot Corporation) as the external additive A, 0.5 part of the silicone resin particles A obtained in Production Example 1 as the external additive B, and 1.0 part of positively-chargeable silica particles being surface-hydrophobized with a hydrophobizing agent (aminosilane) and having a number average particle diameter of 50 nm (product name: H05TA, manufactured by: Clariant Corporation) as the external additive C, were added. Using a high-speed mixer (product name: FM MIXER, manufactured by: Nippon Coke & Engineering Co., Ltd.), they were mixed and stirred at a peripheral speed of 40 m/s for 10 minutes to add the external additives on the colored resin particles, thereby obtaining the toner of Example 1.

Examples 2 to 8 and Comparative Examples 1 to 6

Toners of Examples 2 to 8 and Comparative Examples 1 to 6 were produced in the same manner as Example 1, except that the types and/or amounts of the external additives were changed as shown in Tables 1 and 2.

TABLE 1

|  | Example 1 | Example 2 | Example 3 | Example 4 | Example 5 | Example 6 | Example 7 | Example 8 |
|---|---|---|---|---|---|---|---|---|
| External additive A | Silica particles (TG7120) | Silica particles (TG7120) | Silica particles (TG7120) | Silica particles (TG7120) | Silica particles (TG7120) | Silica particles (TG7120) | Silica particles (TG7120) | Silica particles (TG7120) |

TABLE 1-continued

|  | Example 1 | Example 2 | Example 3 | Example 4 | Example 5 | Example 6 | Example 7 | Example 8 |
|---|---|---|---|---|---|---|---|---|
| Hydrophobizing agents | HDMS and cyclic silazane | HDMS and cyclic silazane | HDMS and cyclic silazane | HDMS and cyclic silazane | HDMS and cyclic silazane | HDMS and cyclic silazane | HDMS and cyclic silazane | HDMS and cyclic silazane |
| Number average particle diameter (nm) | 20 | 20 | 20 | 20 | 20 | 20 | 20 | 20 |
| Amount (part) | 0.8 | 0.8 | 0.8 | 0.8 | 0.8 | 0.8 | 0.2 | 1.8 |
| External additive B | Silicone particles A | Silicone particles B | Silicone particles C | Silicone particles A | Silicone particles A | Silicone particles A | Silicone particles A | Silicone particles A |
| Material for particles | Silicone | Silicone | Silicone | Silicone | Silicone | Silicone | Silicone | Silicone |
| Number average particle diameter (μm) | 0.09 | 0.30 | 0.20 | 0.09 | 0.09 | 0.09 | 0.09 | 0.09 |
| Theoretical specific surface area (TS) ($m^2/g$) | 50 | 15 | 23 | 50 | 50 | 50 | 50 | 50 |
| BET specific surface area (BS) ($m^2/g$) | 230 | 220 | 200 | 230 | 230 | 230 | 230 | 230 |
| BS/TS | 4.6 | 14.6 | 8.9 | 4.6 | 4.6 | 4.6 | 4.6 | 4.6 |
| Amount of added particles (part) | 0.5 | 0.5 | 0.5 | 0.5 | 0.2 | 1.0 | 0.5 | 0.5 |
| Dv90/Dv50 | 2.2 | 2.7 | 2.4 | 2.2 | 2.2 | 2.2 | 2.2 | 2.2 |
| Form | Spherical | Spherical | Spherical | Spherical | Spherical | Spherical | Spherical | Spherical |
| Sphericity (Sc/Sr) | 0.988 | 0.985 | 0.988 | 0.988 | 0.988 | 0.988 | 0.988 | 0.988 |
| Water adsorption amount (%) | 0.35 | 0.18 | 0.22 | 0.35 | 0.35 | 0.35 | 0.35 | 0.35 |
| External additive C | Silica particles (H05TA) | Silica particles (H05TA) | Silica particles (H05TA) | — | Silica particles (H05TA) | Silica particles (H05TA) | Silica particles (H05TA) | Silica particles (H05TA) |
| Hydrophobizing agent | Aminosilane | Aminosilane | Aminosilane | — | Aminosilane | Aminosilane | Aminosilane | Aminosilane |
| Number average particle diameter (nm) | 50 | 50 | 50 | — | 50 | 50 | 50 | 50 |
| Amount (part) | 1.0 | 1.0 | 1.0 | — | 1.0 | 1.0 | 1.0 | 1.0 |
| Toner chargeability | Positively-chargeable | Positively-chargeable | Positively-chargeable | Positively-chargeable | Positively-chargeable | Positively-chargeable | Positively-chargeable | Positively-chargeable |
| Minimum fixing temperature | 150 | 150 | 150 | 145 | 150 | 155 | 145 | 155 |
| Post-endurance supply election | B | A | B | B | B | A | B | B |
| Filming | 20000< | 20000< | 20000< | 13000 | 11000 | 12000 | 13000 | 11000 |
| Printing durability (sheets) | 20000< | 20000< | 20000< | 13000 | 11000 | 20000< | 13000 | 20000< |
| Solid pattern followability | 0.1 | 0.0 | 0.1 | 0.3 | 0.3 | 0.2 | 0.3 | 0.0 |

TABLE 2

|  | Comparative Example 1 | Comparative Example 2 | Comparative Example 3 | Comparative Example 4 | Comparative Example 5 | Comparative Example 6 |
|---|---|---|---|---|---|---|
| External additive A | Silica particles (TG7120) | Silica particles (TG7120) | Silica particles (TG7120) | Silica particles (TG7120) | — | — |
| Hydrophobizing agents | HDMS and cyclic silazane | HDMS and cyclic silazane | HDMS and cyclic silazane | HDMS and cyclic silazane | — | — |
| Number average particle diameter (nm) | 20 | 20 | 20 | 20 | — | — |
| Amount (part) | 0.8 | 0.8 | 0.8 | 0.8 | — | — |
| External additive B | MSP-050 | TOREFIL R925 | TG-C191 | SPZ-100F | Silicone particles A | Silicone particles A |
| Material for particles | Silicone | Silicone | Silica | Metallic soap | Silicone | Silicone |
| Number average particle diameter (μm) | 0.50 | 0.50 | 0.10 | 0.50 | 0.09 | 0.09 |
| Theoretical specific surface area (TS) ($m^2/g$) | 9 | 9 | 29 | 11 | 50 | 50 |

TABLE 2-continued

|  | Comparative Example 1 | Comparative Example 2 | Comparative Example 3 | Comparative Example 4 | Comparative Example 5 | Comparative Example 6 |
|---|---|---|---|---|---|---|
| BET specific surface area (BS) ($m^2/g$) | 22 | 24 | 30 | 6 | 230 | 230 |
| BS/TS | 2.4 | 2.6 | 1.0 | 0.55 | 4.6 | 4.6 |
| Amount of added particles (part) | 0.5 | 0.5 | 0.5 | 0.5 | 0.5 | 0.5 |
| Dv90/Dv50 | 1.3 | 2.4 | 1.6 | 0.1 | 2.2 | 2.2 |
| Form | Spherical | Spherical | Spherical | irregular | Spherical | Spherical |
| Sphericity (Sc/Sr) | 0.984 | 0.981 | 0.989 | 0.952 | 0.988 | 0.988 |
| Water adsorption amount (%) | 0.24 | 0.56 | 0.89 | 0.10 | 0.35 | 0.35 |
| External additive C | Silica particles (H05TA) | Silica particles (H05TA) | Silica particles (H05TA) | Silica particles (H05TA) | Silica particles (H05TA) | — |
| Hydrophobizing agent | Aminosilane | Aminosilane | Aminosilane | Aminosilane | Aminosilane | — |
| Number average particle diameter (nm) | 50 | 50 | 50 | 50 | 50 | — |
| Amount (part) | 1.0 | 1.0 | 1.0 | 1.0 | 1.0 | — |
| Toner chargeability | Positively-chargeable | Positively-chargeable | Positively-chargeable | Positively-chargeable | Positively-chargeable | Positively-chargeable |
| Minimum fixing temperature | 155 | 155 | 160 | 160 | 140 | 130 |
| Post-endurance supply election | D | D | D | D | D | Not evaluated |
| Filming | 10000 | 11000 | 8000 | 3000 | 10000 | 1000 |
| Printing durability (sheets) | 13000 | 11000 | 9000 | 14000 | 10000 | 1000 |
| Solid pattern followability | 0.3 | 0.4 | 0.1 | 0.6 | 0.6 | 0.7 |

5. Overall Evaluation of Toners

Table 1 shows the evaluation results of the toners of Examples and the properties of the external additives. Table 2 shows the evaluation results of the toners of Comparative Examples and the properties of the external additives.

The toner of Comparative Example 6 is a toner in which the external additive A was not used and, as the external additive B, the silicone resin particles A having a BS/TS ratio of 4.6 and a number average particle diameter of 0.09 μm were used alone. For the toner of Comparative Example 6, the solid pattern followability is 0.7 and high, and the numbers of the sheets in the evaluation items of "Filming" and "Printing durability" are both 1,000 sheets and quite small. The ejection at post-endurance supply evaluation of the toner was not evaluated since the number of the sheets in "Printing durability" was 1,000 sheets and too small. However, it was thought that the toner is likely to cause ejection at post-endurance supply. Therefore, it was revealed that even in the case of using, as the external additive B, silicone resin particles having a BS/TS ratio in a range of from 3.0 to 30.0 and having a number average particle diameter of from 0.05 μm to 1.00 μm, the toner in which the external additive B is used alone, is likely to cause ejection at post-endurance supply and filing and is poor in solid pattern followability and printing durability.

The toner of Comparative Example 5 is a toner in which the external additive A was not used and, as the external additive B, the silicone resin particles A having a BS/TS ratio of 4.6 and a number average particle diameter of 0.09 μm were used in combination with, as the external additive C, the commercially-available positively-chargeable silica particles being surface-hydrophobized with aminosilane and having a number average particle diameter of 50 nm (product name: H05TA, manufactured by: Clariant Corporation). For the toner of Comparative Example 5, severe ejection that did not end during printing of up to 100 sheets, occurred. Moreover, the solid followability was 0.6 and high. Therefore, it was revealed that the toner in which, as the external additive B, silicone resin particles having a BS/TS ratio in a range of from 3.0 to 30.0 and having a number average particle diameter of from 0.05 μm to 1.00 μm, are used in combination with, as the external additive C, large positively-chargeable silica particles being surface-hydrophobized with aminosilane and having a number average particle diameter of more than 30 nm, is likely to cause ejection at post-endurance supply and is poor in solid followability.

The toner of Comparative Example 1 is a toner in which, as the external additive A, the positively-chargeable silica particles being surface-hydrophobized with the hydrophobizing agents (hexamethylsilazane and cyclic silazane) and having a number average particle diameter of 20 nm (product name: TG7120, manufactured by: Cabot Corporation) were used in combination with, as the external additive B, commercially-available silicone resin particles having a BS/TS ratio of 2.4 (product name: MSP-050, manufactured by: Nikko Rica Corporation). For the toner of Comparative Example 1, severe ejection that did not end during printing of up to 100 sheets, occurred. Therefore, it was revealed that in the case of using, as the external additive B, the silicone resin particles having a BS/TS ratio of less than 3.0 and a small porosity, the toner is likely to cause ejection at post-endurance supply, even if the external additive B is used in combination with the external additive A that is the surface-hydrophobized, positively-chargeable silica particles having a number average particle diameter of 20 nm.

The toner of Comparative Example 2 is a toner in which, as the external additive A, the commercially-available silica particles (product name: TG7120, manufactured by: Cabot Corporation) were used in combination with, as the external additive B, commercially-available silicone resin particles having a BS/TS ratio of 2.6 and Dv90/Dv50 of 2.4 (product name: TOREFIL R925, manufactured by: Dow Corning Toray Co., Ltd.) For the toner of Comparative Example 2, severe ejection that did not end during printing of up to 100 sheets, occurred. Moreover, the solid pattern followability was 0.4 and high. Therefore, it was revealed that in the case of using, as the external additive B, the silicone resin particles having a BS/TS ratio of less than 3.0 and a small porosity, the toner is likely to cause ejection at post-endurance supply and is poor in solid pattern followability, even if the external additive B is used in combination with the external additive A that is the surface-hydrophobized, positively-chargeable silica particles having a number average particle diameter of 20 nm.

The toner of Comparative Example 3 is a toner in which, as the external additive A, the commercially-available silica particles (product name: TG7120, manufactured by: Cabot Corporation) were used in combination with, as the external additive B, commercially-available silica particles having a BS/TS ratio of 1.0 (product name: TG-C191, manufactured by: Cabot Corporation). For the toner of Comparative Example 3, severe ejection that did not end during printing of up to 100 sheets, occurred. Moreover, the minimum fixing temperature is 160° C. and high; the number of the sheets in "Filming" is 8,000 sheets and small; and the number of sheets in "Printing durability" is 9,000 sheets and small. Therefore, it was revealed that in the case of using, as the external additive B, the silica particles having a BS/TS ratio of less than 3.0 and a small porosity, the toner is likely to cause ejection at post-endurance supply and filming and is poor in printing durability and low-temperature fixability, even if the external additive B is used in combination with the external additive A that is the surface-hydrophobized, positively-chargeable silica particles having a number average particle diameter of 20 nm.

The toner of Comparative Example 4 is a toner in which, as the external additive A, the commercially-available silica particles (product name: TG7120, manufactured by: Cabot Corporation) were used in combination with, as the external additive B, a commercially-available metallic soap having a BS/TS ratio of 0.55 (product name: SPZ-100F, manufactured by: Sakai Chemical Industry Co., Ltd.) For the toner of Comparative Example 4, severe ejection that did not end during printing of up to 100 sheets, occurred. Moreover, the solid pattern followability was 0.6 and high; the minimum fixing temperature was 160° C. and high; and the number of sheets in the evaluation item of "Filming" was 3,000 sheets and small. Therefore, it was revealed that in the case of using, as the external additive B, the metallic soap having a BS/TS ratio of less than 3.0 and a small porosity, the toner is likely to cause ejection at post-endurance supply and filming and is poor in low-temperature fixability and solid pattern followability, even if the external additive B is used in combination with the external additive A that is the surface-hydrophobized, positively-chargeable silica particles having a number average particle diameter of 20 nm.

Meanwhile, the toners of Examples 1 to 8 are each a toner in which at least two external additives are used in combination, that is, a toner in which, as the external additive A, the commercially-available silica particles being surface-hydrophobized with the hydrophobizing agents (hexamethylsilazane and cyclic silazane) and having a number average particle diameter of 20 nm (product name: TG7120, manufactured by: Cabot Corporation) were used in combination with, as the external additive B, the silicone resin particles having a BS/TS ratio of from 4.6 to 14.6 and a number average particle diameter of from 0.09 μm to 0.3 μm. Also, each of the toners of Examples 1 to 8 contains, with respect to 100 parts of the colored resin particles, the external additive A in an amount of from 0.2 part to 1.8 parts, and the external additive B in an amount of from 0.2 part to 1.0 part.

For the toners of Examples 1 to 8, the minimum fixing temperature was 155° C. or less and low; slight ejection that ended during printing of up to 3 sheets, was only confirmed; the numbers of the sheets in "Filming" and "Printing durability" were both 11,000 sheets or more and large; and the value of solid pattern followability was 0.3 or less and small.

For the toner of Example 1 containing the external additive C, the numbers of the sheets in "Filming" and "Printing durability" are both at least 7,000 sheets larger than the toner of Example 4 in which the external additive C was not contained. Therefore, it was revealed that the filming and printing durability properties are further increased by adding the external additive C.

Therefore, it is revealed that the toners of Examples 1 to 8 are less likely to cause ejection at post-endurance supply and filming, and are also excellent in low-temperature fixability, solid followability and printing durability. Such toners of Examples 1 to 8 contain combination of at least: as the external additive A, the specific amount of the silica particles being surface-hydrophobized with at least one hydrophobizing agent selected from the group consisting of a hydrophobizing agent containing an amino group, a silane coupling agent and silicone oil, and having a number average particle diameter of from 5 nm to 30 nm; and, as the external additive B, the specific amount of the silicone resin particles having a BS/TS ratio in a range of from 3.0 to 30.0 and having a number average particle diameter of from 0.05 μm to 1.00 μm.

The invention claimed is:

1. A toner for developing electrostatic images, comprising colored resin particles that comprises a binder resin, a colorant and a charge control agent, and external additives,
wherein the external additives contain at least an external additive A, an external additive B and an external additive C;
wherein the external additive A is silica particles being surface-hydrophobized with at least one hydrophobizing agent selected from the group consisting of a hydrophobizing agent containing an amino group, a silane coupling agent and silicone oil, and having a number average particle diameter of from 5 nm to 30 nm;
wherein the external additive B is silicone resin particles having a ratio (BS/TS) of a BET specific surface area (BS), which is measured by a gas adsorption method for measuring an amount of a monolayer of nitrogen gas adsorbed on a particle surface with the use of the formula of BET, to a theoretical specific surface area (TS), which is obtained by calculating from a number average particle diameter measured by scanning electron microscope (SEM) observation on a theoretical calculation formula, in a range of from 3.0 to 30.0, and having a number average particle diameter of from 0.05 μm to 1.00 μm, and the theoretical calculation formula is defined as:

Theoretical specific surface area $TS$ (m$^2$/g) =6/(average density (g/cm$^3$)×number average particle diameter (nm)×10$^3$);

wherein the external additive C is silica particles being surface-hydrophobized with at least one hydrophobizing agent selected from the group consisting of a hydrophobizing agent containing an amino group, a silane coupling agent and silicone oil, and having a number average particle diameter of from 31 nm to 200 nm;

wherein, with respect to 100 parts by mass of the colored resin particles, a content of the external additive A is from 0.1 part by mass to 2.0 parts by mass, a content of the external additive B is from 0.1 part by mass to 1.0 part by mass, and a content of the external additive C is from 0.1 part by mass to 3.0 parts by mass; and wherein, the colored resin particles, the external additive A and the external additive C are positively chargeable, and particles of the toner are positively chargeable.

2. The toner for developing electrostatic images according to claim 1, wherein a water adsorption amount of the external additive B is 1.0% by mass or less.

3. The toner for developing electrostatic images according to claim 1, wherein a form of the external additive B is a spherical form.

\* \* \* \* \*